United States Patent
Harris et al.

(10) Patent No.: US 9,828,045 B1
(45) Date of Patent: Nov. 28, 2017

(54) TRUCK-BED-MOUNTED SPARE WHEEL CARRIER

(71) Applicant: Toyota Motor Engineering & Manufacturing North America, Inc., Erlanger, KY (US)

(72) Inventors: Ryan C. Harris, Saline, MI (US); Scott L. Frederick, Brighton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/496,558

(22) Filed: Apr. 25, 2017

(51) Int. Cl.
  *B62D 43/02* (2006.01)
  *B62D 33/02* (2006.01)

(52) U.S. Cl.
  CPC ............. *B62D 43/02* (2013.01); *B62D 33/02* (2013.01)

(58) Field of Classification Search
  CPC ........ B62D 43/02; B62D 43/04; B62D 43/06; B62D 43/08; B62D 43/10; B62D 33/02
  See application file for complete search history.

(56) References Cited

U.S. PATENT DOCUMENTS

| | | | | |
|---|---|---|---|---|
| 1,724,655 A * | 8/1929 | Hunt | ...................... | B62D 43/02 224/42.15 |
| 1,895,024 A * | 1/1933 | Coquille | ................ | B62D 43/02 224/42.15 |
| 4,282,994 A * | 8/1981 | Hilliard | .................. | B62D 43/02 224/42.15 |
| 4,327,849 A * | 5/1982 | Sharpton | ................ | B60K 15/06 224/42.13 |
| 5,957,346 A | 9/1999 | Schambre et al. | | |
| 7,100,956 B1 * | 9/2006 | Wilkins | ..................... | B60P 3/40 296/37.2 |
| 7,303,222 B2 | 12/2007 | Wilkins | | |
| 7,533,789 B1 * | 5/2009 | Seely | ......................... | B60R 9/06 224/282 |
| 8,777,070 B2 * | 7/2014 | Moore | ..................... | B60R 11/06 224/42.13 |
| 2006/0091171 A1 * | 5/2006 | Wardell | .................... | B60R 9/00 224/504 |
| 2007/0034655 A1 * | 2/2007 | Storer | .................... | B62D 43/02 224/403 |
| 2009/0191033 A1 | 7/2009 | Cook | | |

FOREIGN PATENT DOCUMENTS

KR   101558481 B1   10/2015

* cited by examiner

*Primary Examiner* — Corey Skurdal
(74) *Attorney, Agent, or Firm* — Christopher G. Darrow; Darrow Mustafa PC

(57) ABSTRACT

A spare wheel carrier for a vehicle includes a wheel frame having an upright axis, a rotary bearing, and multiple surface-mountable linear slides. The wheel frame includes a hub and multiple outboard generally planar wheel-bearing wheel faces. The wheel faces have circumferentially-spaced respective inclined orientations whereby the wheel faces are inclined towards one another in a converging relationship, and each wheel face is configured to support a spare wheel on its side in its inclined orientation. The rotary bearing is configured to support the wheel frame, by its hub, for axial rotation. The linear slides, on the other hand, are configured to carry a bridge between them, and support the rotary bearing, and the wheel frame, via the rotary bearing, on the bridge for radial movement.

19 Claims, 5 Drawing Sheets

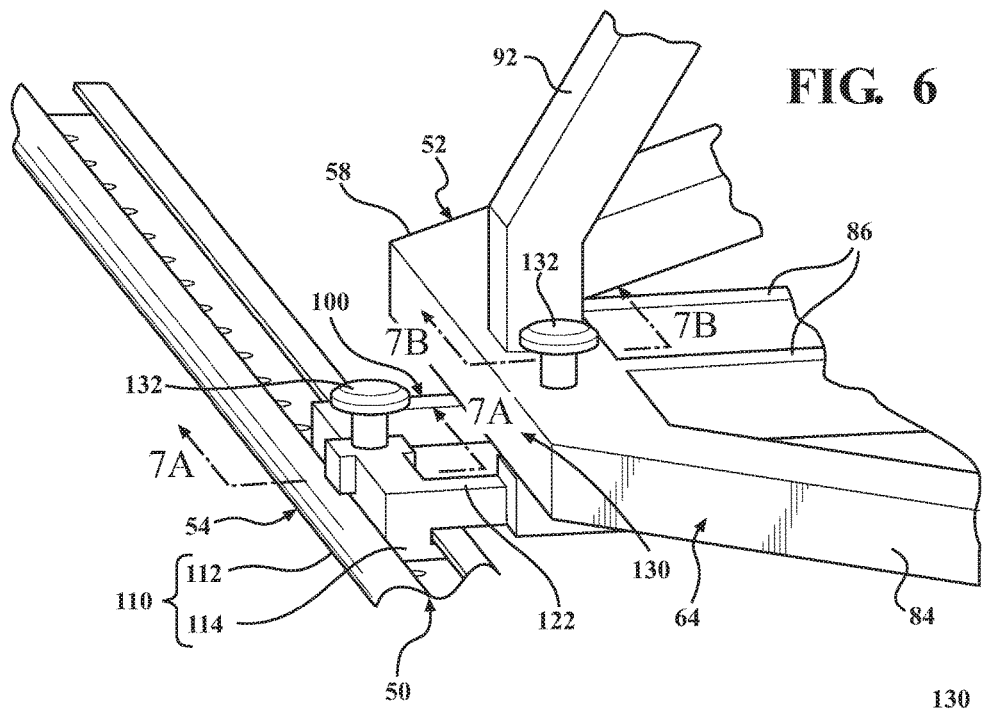
FIG. 6
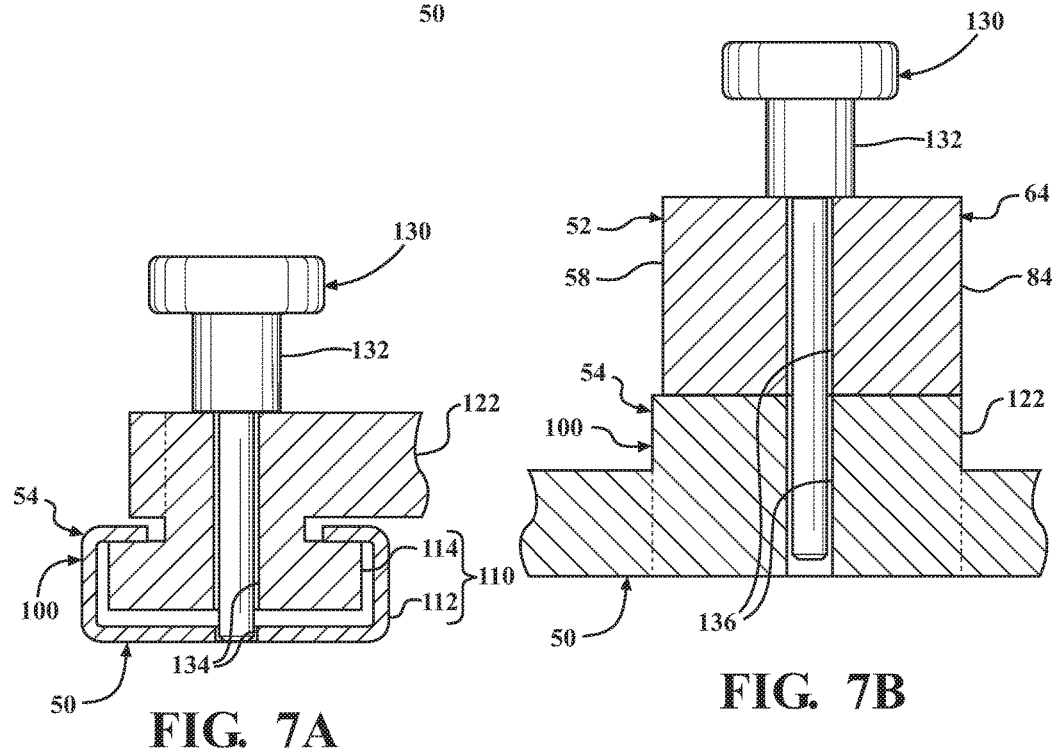
FIG. 7A
FIG. 7B

TRUCK-BED-MOUNTED SPARE WHEEL CARRIER

TECHNICAL FIELD

The embodiments disclosed herein generally relate to the stowage of spare wheels in vehicles and, more particularly, to the stowage of spare wheels in truck beds.

BACKGROUND

Many vehicles ride on wheels. These vehicles are sometimes rendered inoperable when one of their active wheels becomes irrevocably damaged (e.g., when the wheel's tire become flat). In recognition of this, vehicles are commonly equipped to stow a spare wheel. In such a vehicle, the onboard spare wheel serves as a convenient field replacement for a damaged active wheel. In the absence of the onboard spare wheel, a user would have to arrange to either have a spare wheel delivered to the vehicle in the field, or have the vehicle towed or otherwise transported from the field to a location with a spare wheel.

Although the general need to stow spare wheels in vehicles is reflected in the common availability of vehicles equipped to do so, this need is amplified in connection with certain vehicle activities. This need is amplified in connection with off-roading, for instance, not only by the tendency for off-roading to cause irrevocable damage to active wheels, but also by the remoteness of off-roading locations. In the trucks typically used for off-roading, their beds sometimes serve as the location for stowing spare wheels.

SUMMARY

Disclosed herein are embodiments of a spare wheel carrier, and a vehicle including the components of a spare wheel carrier. In one aspect, a spare wheel carrier includes a wheel frame having an upright axis, and a surface-mountable undercarriage. The wheel frame includes multiple differently arranged wheel supports each configured to securely carry a spare wheel. The undercarriage is configured to support the wheel frame for radial movement and axial rotation with respect to the surface under which each wheel support is subject to arrangement towards a defined user location.

In another aspect, a vehicle includes a bed, a wheel frame having an upright axis located above the bed, and an undercarriage mounted to the bed between it and the wheel frame. The wheel frame includes multiple differently arranged wheel supports each configured to securely carry a spare wheel. The undercarriage is configured to support the wheel frame for radial movement and axial rotation with respect to the bed under which each wheel support is subject to arrangement towards a defined user location at the rear of the vehicle.

In yet another aspect, a spare wheel carrier includes a wheel frame having an upright axis, a rotary bearing, and multiple surface-mountable linear slides. The wheel frame includes a hub and multiple outboard generally planar wheel-bearing wheel faces. The wheel faces have circumferentially-spaced respective inclined orientations whereby the wheel faces are inclined towards one another in a converging relationship, and each wheel face is configured to support a spare wheel on its side in its inclined orientation. The rotary bearing is configured to support the wheel frame, by its hub, for axial rotation. The linear slides, on the other hand, are configured to carry a bridge between them, and support the rotary bearing, and the wheel frame, via the rotary bearing, on the bridge for radial movement.

These and other aspects will be described in additional detail below.

BRIEF DESCRIPTION OF THE DRAWINGS

The various features, advantages and other uses of the present embodiments will become more apparent by referring to the following detailed description and drawing in which:

FIG. 6 is an enlarged perspective view of the spare wheel carrier, better showing aspects of a lock system that locks the spare wheel carrier's wheel frame from the movement for which it is supported by the spare wheel carrier's undercarriage;

FIG. 7A is a cross section of the of the spare wheel carrier taken across the line 7A-7A in FIG. 6, showing aspects of a first lock member by which the spare wheel carrier's lock system locks its wheel frame from the radial movement for which the translational support system of the spare wheel carrier's undercarriage supports the wheel frame; and FIG. 7B is a cross section of the of the spare wheel carrier taken across the line 7B-7B in FIG. 6, showing aspects of a second lock member by which the spare wheel carrier's lock system locks its wheel frame from the axial rotation for which the rotational support system of the spare wheel carrier's undercarriage supports the wheel frame.

DETAILED DESCRIPTION

This disclosure teaches a truck-bed-mounted spare wheel carrier. The spare wheel carrier includes a wheel frame with multiple wheel supports by which the wheel frame is equipped to securely carry respective spare wheels. In addition to the wheel frame, the spare wheel carrier includes an undercarriage that supports the wheel frame for multi-axis movement under which the wheel supports and any onboard spare wheels are rearranged, with respect to the bed, towards a user location. With the overall configuration of the wheel frame and its wheel supports, space constraints are satisfied notwithstanding the convenience afforded by the multiple wheel supports and, by extension, the multiple onboard spare wheels. Moreover, to the extent it is arranged towards a user location via the undercarriage, each wheel support promotes ergonomically friendly handling of an onboard spare wheel to be unloaded from it, or a spare wheel to be loaded to it, as the case may be.

Figure 1:
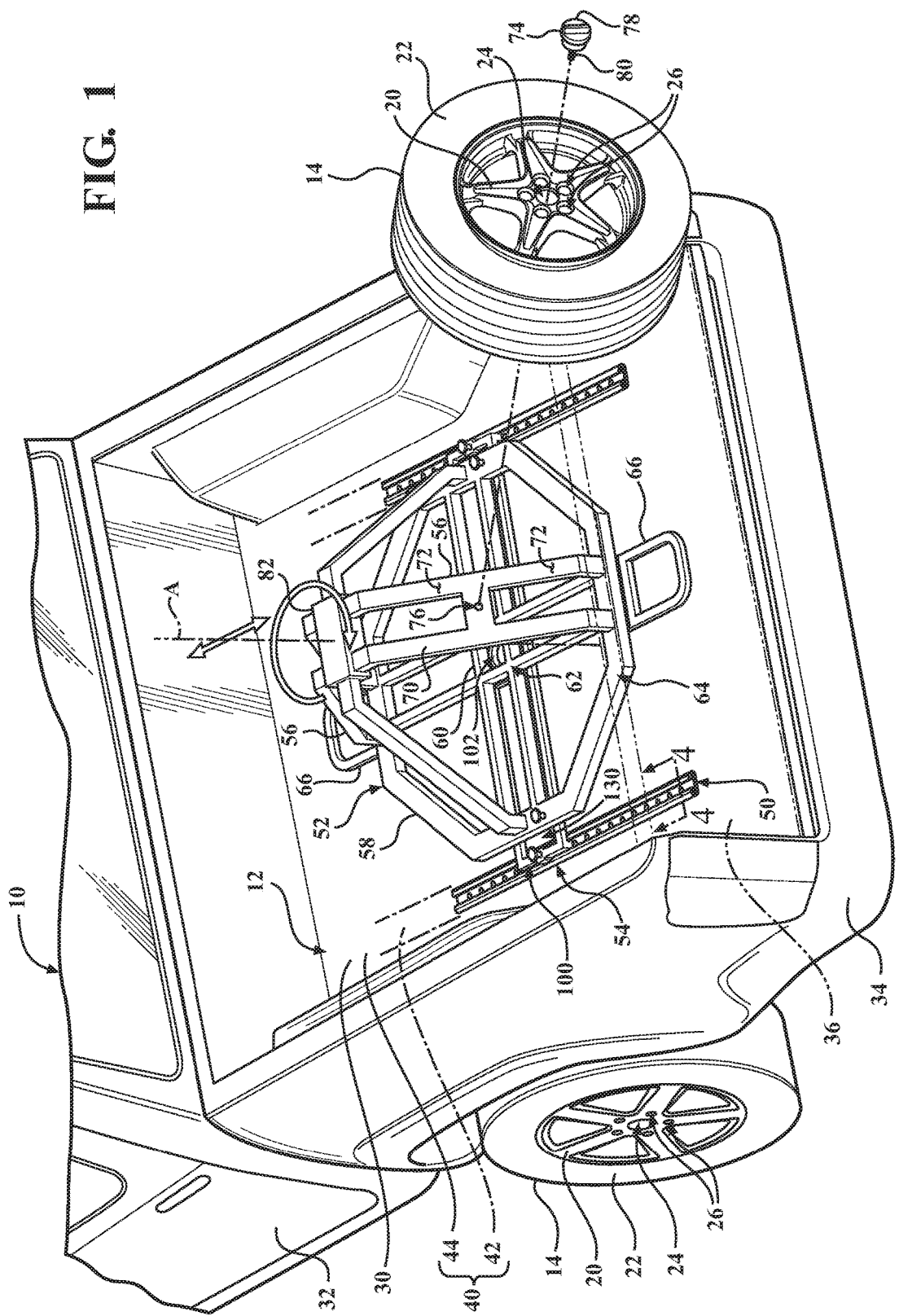
FIG. 1 is a perspective view of a truck-like vehicle that has a spare wheel carrier mounted to its bed, showing, for the spare wheel carrier, a wheel frame that includes multiple wheel supports by which the wheel frame is equipped to securely carry respective spare wheels, and an undercarriage that supports the wheel frame for multi-axis movement under which the wheel supports and any onboard spare wheels are rearranged to ease access to any onboard spare wheels for unloading purposes, and to the wheel supports for loading purposes.

A part of a representative vehicle 10 is shown in FIG. 1. In this description, uses of "front," "forward" and the like, and uses of "rear," "rearward" and the like, refer to the longitudinal direction of the vehicle 10. "Front," "forward" and the like refer to the front (fore) of the vehicle 10, while "rear," "rearward" and the like refer to the back (aft) of the vehicle 10.

The vehicle 10 is a truck that has an exterior and a number of inner compartments. The inner compartments include a passenger compartment, an engine compartment and, for the illustrated vehicle 10, a bed 12.

The vehicle 10 includes, among other things, an engine, motor, transmission and other powertrain components housed in its engine compartment, as well as other powertrain components, such as wheels 14 on which the vehicle 10 rides. The wheels 14 support the remainder of the vehicle 10. One, some or all of the wheels 14 are powered by the remainder of the powertrain components to drive the vehicle 10.

For a representative rear driver's side wheel 14, the wheel 14 has a rim 20 and a tire 22 installed on the outside of the rim 20. The rim 20 includes an apertured disk featuring a center bore 24 and surrounding lug holes 26 arranged according to a lug pattern.

The vehicle 10 has a body that forms the exterior of the vehicle 10 and defines its bed 12 and other inner compartments. In relation to the bed 12, for instance, the body has a floor 30, upright sides 32 with doors and a rear end 34. The body also has a number of closure panels, including a tailgate 36 that, similarly to other closure panels, is connected to the remainder of the body, over the bed 12, for movement between a closed position and an open position permissive of access to the bed 12 from the rear of the vehicle 10.

The body includes a rigid body structure 40 constructed from interconnected frame members, body panels and closure panel frames, as well as auxiliary exterior body panels overlying the outside of the body structure 40. In relation to the bed 12, for instance, the body structure 40 is represented by a pair of spaced apart longitudinally extending side rails 42 and an overlying floor panel 44.

A spare wheel carrier 50 is surface-mounted to the bed 12 of the vehicle 10. As shown with additional reference to FIG. 2, the spare wheel carrier 50 includes an above-bed wheel frame 52 and an undercarriage 54 mounted between the bed 12 and the wheel frame 52. The wheel frame 52 includes multiple wheel supports 56 by which the wheel frame 52 is equipped to securely carry respective spare wheels 14 that are the same as or otherwise similar to the wheels 14 on which the vehicle 10 rides. In order to accommodate the multiple wheel supports 56 and, by extension, multiple onboard spare wheels 14, the wheel supports 56 are mutually arranged differently from one another. With the different arrangements of the wheel supports 56, any onboard spare wheels 14 are arranged differently from one another as well. The undercarriage 54 supports the wheel frame 52 for movement under which the wheel supports 56 and any onboard spare wheels 14 are rearranged, with respect to the bed 12, towards a user location. This eases access to any onboard spare wheels 14 for unloading purposes, and to the wheel supports 56 for loading purposes.

In its above-bed configuration, the wheel frame 52 is substantially not elevated from the bed 12, and has a vertical or otherwise upright axis A. In addition to its wheel supports 56, the wheel frame 52 includes a base 58. In the spare wheel carrier 50, the undercarriage 54 supports the wheel frame 52 for movement by its base 58. Accordingly, as part of its base 58, the wheel frame 52 includes a mounting interface by which the wheel frame 52 is mounted to the undercarriage 54. In a centrally supported configuration, this mounting interface is a single-point mounting interface represented by a centrally located hub 60 at the axis A of the wheel frame 52.

In addition to including a mounting interface, the base 58 serves as a platform for the remainder of the wheel frame 52, including its wheel supports 56. With the base 58 underlying the wheel supports 56, the base 58, like the remainder of the wheel frame 52, is substantially not elevated from the bed 12. In a generally planar configuration, the base 58 is oriented, commonly with the bed 12, normally to the axis A of the wheel frame 52. In this and other configurations, the base 58 has a central area 62 through which the axis A of the wheel frame 52 extends, and at which the hub 60 is located, and a peripheral area 64.

The wheel frame 52 includes, as part of its base 58, one or more outboard handles 66 at the peripheral area 64 thereof. The handles 66 facilitate a user's manual rearrangement of the wheel frame 52 and, by extension, its wheel supports 56 and any onboard spare wheels 14, under the movement for which the undercarriage 54 supports the wheel frame 52.

With the base 58 serving as their platform, the wheel supports 56 extend from the base 58 upward along the axis A of the wheel frame 52. The wheel frame 52, by each wheel support 56, is equipped to securely carry a spare wheel 14. To securely carry a spare wheel 14, each wheel support 56 is sized, shaped and otherwise configured to support a spare wheel 14, and secure it to the wheel frame 52.

As part of its wheel supports 56, the wheel frame 52 features multiple respective wheel-bearing wheel faces 70. Each wheel face 70 is configured to selectively support a spare wheel 14. To support a spare wheel 14, each wheel face 70 defines one or more surfaces 72 that engage a spare wheel 14, and bear some of its weight. These surfaces 72 define the orientation of the wheel face 70. Since it uses them to support a spare wheel 14, these surfaces 72 also define the orientation of the wheel support 56 to which the wheel face 70 belongs.

Each wheel face 70, in a generally planar configuration, defines one or more surfaces 72 lying in a common plane. These surfaces 72 engage the side of a spare wheel 14, and bear some of its weight, to support the spare wheel 14, on its side, in the orientation of the wheel support 56 to which the wheel face 70 belongs.

In addition to the wheel faces 70, the wheel frame 52 features respective associated wheel fasteners 74 as part of its wheel supports 56. With a given wheel face 70 supporting a spare wheel 14, the associated wheel fastener 74 is configured to selectively secure the spare wheel 14 to the wheel frame 52, against the wheel face 70, in the orientation of the wheel support 56 to which the wheel face 70 and the associated wheel fastener 74 belong.

In a generally boltlike configuration of the wheel fasteners 74, each wheel face 70 has a threaded hole 76, and each associated wheel fastener 74 includes a head 78 and a threaded shank 80 projecting from the head 78 that is complementary to the threaded hole 76. With a given wheel face 70 supporting a spare wheel 14, the head 78 of the associated wheel fastener 74 engages the rim 20 of the spare wheel 14, and the threaded shank 80 extends through the center bore 24 of the rim 20, or otherwise through the rim 20, for threaded engagement with the complementary threaded hole 76 of the wheel face 70.

To unload an onboard spare wheel 14 from a given wheel support 56, a user un-secures the spare wheel 14 from against the wheel face 70 via the associated wheel fastener 74, and handles the spare wheel 14 to remove the spare wheel 14 from its supported relationship with the wheel face 70. On the other hand, to load an off-board spare wheel 14 to a given wheel support 56, a user handles the spare wheel 14 to obtain, for the spare wheel 14, a supported relationship with the wheel face 70, and secures the spare wheel 14 against the wheel face 70 via the associated wheel fastener 74.

In an implementation of the wheel frame 52 that features respective outboard wheel faces 70 as part of its wheel supports 56, the wheel faces 70 extend from the base 58 upward along the axis A of the wheel frame 52. The wheel faces 70 are, accordingly, generally upstanding. Beyond being upstanding, the wheel faces 70 are, more specifically, tilted back or, in other words, inclined.

The wheel faces 70 are mutually arranged in order to accommodate the corresponding mutual arrangement of the multiple wheel supports 56 to which the respective wheel faces 70 belong and, by extension, multiple onboard spare wheels 14. In a circumferentially-spaced arrangement, the wheel faces 70 extend from the base 58 at circumferentially-spaced respective portions of its peripheral area 64. With their inclined orientations, the wheel faces 70 are inclined towards one another in a converging relationship, and meet at a crown 82 at the axis A of the wheel frame 52 that connects the wheel faces 70. The wheel supports 56 to which the respective wheel faces 70 belong accordingly have circumferentially-spaced respective inclined or otherwise upstanding orientations and, by their respective wheel faces 70 and respective associated wheel fasteners 74, securely carry respective spare wheels 14, on their sides, in the circumferentially-spaced respective inclined or otherwise upstanding orientations of the wheel supports 56.

In an example implementation for full-size spare wheels 14, the wheel frame 52 includes two wheel supports 56 by which the wheel frame 52 is equipped to securely carry two respective full-size spare wheels 14. As part of these wheel supports 56, the wheel frame 52 features two respective inclined or otherwise upstanding wheel faces 70, at opposing sides of the wheel frame 52, that extend from the base 58 at opposed respective portions of its peripheral area 64, and two respective associated wheel fasteners 74. In this implementation, the two wheel supports 56 to which the two respective wheel faces 70 belong accordingly have opposing respective inclined or otherwise upstanding orientations and, by their respective wheel faces 70 and respective associated wheel fasteners 74, securely carry two respective spare wheels 14, on their sides, in the opposing respective inclined or otherwise upstanding orientations of the two wheel supports 56.

In these and other implementations, the wheel frame 52 accommodates multiple wheel supports 56 and, by extension, multiple onboard spare wheels 14, while satisfying space constraints dictated by the size of the bed 12 and the size of the spare wheels 14. The inclined or otherwise upstanding orientations in which the spare wheels 14 are securely carried by respective wheel supports 56 are ergonomically friendly for a user to maintain for unloading purposes, and to obtain for loading purposes. Accordingly, to the extent a given wheel support 56 is arranged towards a user location, human factors constraints calling for ergonomically friendly handling of an onboard spare wheel 14 to be unloaded from the wheel support 56, or a spare wheel 14 to be loaded to the wheel support 56, as the case may be, are also satisfied.

The wheel frame 52, with its generally planar base 58, and multiple generally planar outboard wheel faces 70 as part of its respective wheel supports 56, has a generally polyhedral shape. The wheel frame 52, including its base 58 and its wheel supports 56, may be constructed from any combination of rigidly interconnected frame members, panels and other components. Although, in its illustrated configuration, the wheel frame 52 is constructed from separately made components, it will be understood that some or all of these components could be made as a unitary whole. The separately made components of the wheel frame 52 may be interconnected with fasteners, welds, adhesives or any combination of these. The components of the wheel frame 52 may be made from metal or any other suitable material or combination of materials.

In its illustrated configuration, the wheel frame 52 has a generally open structure constructed from rigidly interconnected frame rails that collectively form its base 58 and its wheel supports 56.

The frame rails forming the base 58 are oriented normally to the axis A of the wheel frame 52. These frame rails include a loop of peripheral frame rails 84 at the peripheral area 64 of the base 58, as well as interior frame rails 86 that radiate inward from the peripheral frame rails 84 to the central area 62 of the base 58, where they form the hub 60.

The frame rails forming the wheel supports 56 extend upward along the axis A of the wheel frame 52. These frame rails include primary exterior frame rails 90 and auxiliary exterior frame rails 92 that, in inclined orientations, radiate inward from the peripheral frame rails 84, as well as a crown frame rail 94 at which the primary exterior frame rails 90 and the auxiliary exterior frame rails 92 converge at the axis A of the wheel frame 52. The primary exterior frame rails 90 include multiple opposing or otherwise circumferentially-spaced units of one or more primary exterior frame rails 90 that respectively form the wheel faces 70, and define their respective threaded holes 76. The auxiliary exterior frame rails 92 brace the units of primary exterior frame rails 90 and, by extension, the respective wheel faces 70 formed by them, as well as the wheel supports 56 to which the respective wheel faces 70 belong.

In addition to the wheel frame 52, the spare wheel carrier 50 includes the undercarriage 54. In a multi-axis movement configuration, the undercarriage 54 supports the wheel frame 52 for translational movement normal to its axis A or, in other words, radial movement, as well as for rotation about its axis A or, in other words, axial rotation. With the undercarriage 54 being mounted between the bed 12 and the wheel frame 52, both the axial rotation and the radial movement are with respect to the bed 12 on which the spare wheel carrier 50 is mounted.

Figure 3:
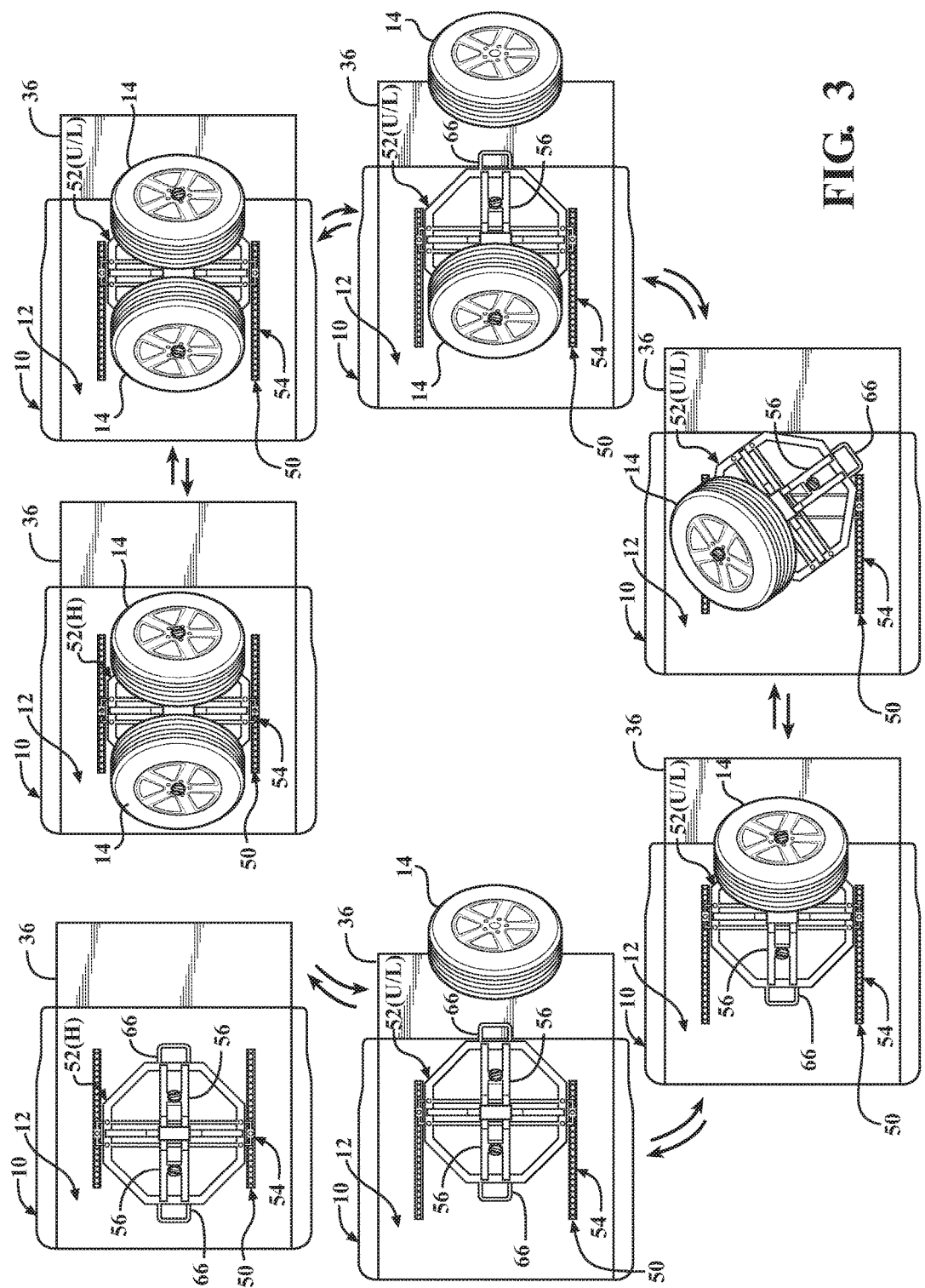
FIG. 3 represents, with reference to top views of the vehicle, the progressions of an example unloading cycle and an example loading cycle, each of which involves rearranging the wheel frame's wheel supports (and any onboard spare wheels, in the case of the unloading cycle) under the radial movement and the axial rotation for which the translational support system and the rotational support system of the spare wheel carrier's undercarriage respectively support the wheel frame.

With additional reference to FIG. 3, in a forward home position H of the wheel frame 52, the wheel frame 52 and any onboard spare wheels 14 are positioned fully inside the bed 12, which allows a user to move the tailgate 36 to its closed position and operate the vehicle 10. Assuming the typical user location outside the open tailgate 36 at the rear of the vehicle 10, under the radial movement, the wheel frame 52 is rearwardly radially moved from its home position H to a rearward unload/load position U/L. This repositions the wheel frame 52 and, by extension, the wheel supports 56 and any onboard spare wheels 14, towards the user location. Under the radial movement, the wheel frame 52 is also forwardly radially moved from its unload/load position U/L back to its home position H. Under the axial rotation, on the other hand, the wheel frame 52 is axially rotated to face a given wheel support 56 and onboard spare wheel 14, if there is one, towards the user location.

As a product of any combination of the radial movement and the axial rotation, the wheel supports 56 and any onboard spare wheels 14 are rearranged, with respect to the bed 12, towards the user location. This eases access to any onboard spare wheels 14 for unloading purposes, and to the wheel supports 56 for loading purposes.

Following operation of the vehicle 10, the wheel frame 52 is presumably in its home position H. In preparation for either unloading or loading, the tailgate 36 is moved to its open position. Both an example unloading cycle and an example loading cycle are represented in FIG. 3, with the unloading cycle progressing in the clockwise direction, and the loading cycle progressing in the counterclockwise direction. The unloading cycle and the loading cycle are described with reference to the example implementation in which the wheel frame 52 includes two wheel supports 56 by which the wheel frame 52 is equipped to securely carry two respective full-size spare wheels 14. However, it will be understood that this description is applicable in principle to other implementations in which the wheel frame 52 includes multiple wheel supports 56 by which the wheel frame 52 is equipped to securely carry respective spare wheels 14.

At the beginning of the unloading cycle, the wheel frame 52, by each wheel support 56, securely carries a spare wheel 14. With a first wheel support 56 and a first onboard spare wheel 14 already facing towards the user location, a user uses a handle 66 to manually reposition the wheel frame 52, under the radial movement for which the undercarriage 54 supports it, towards the user location. With the first wheel support 56 and the first spare wheel 14 now repositioned towards the user location, the user unloads the first spare wheel 14 from the first wheel support 56.

If the first now off-board spare wheel 14 satisfies the user's needs, the user may conclude the unloading cycle by using a handle 66 to manually reposition the wheel frame 52, under the radial movement for which the undercarriage 54 supports it, back to its home position H. Otherwise, with a second wheel support 56 and a second onboard spare wheel 14, unlike the first wheel support 56, not facing towards the user location, the user uses a handle 66 to manually face the second wheel support 56 and the second spare wheel 14, under the axial rotation for which the undercarriage 54 supports the wheel frame 52, towards the user location. With the second wheel support 56 and the second spare wheel 14 facing towards the user location, the user unloads the second spare wheel 14 from the second wheel support 56. With the wheel frame 52 unloaded, the user concludes the unloading cycle by using a handle 66 to manually reposition the wheel frame 52, under the radial movement for which the undercarriage 54 supports it, back to its home position H.

At the beginning of the loading cycle, the wheel frame 52 is unloaded. With a first wheel support 56 already facing towards the user location, a user uses a handle 66 to manually reposition the wheel frame 52, under the radial movement for which the undercarriage 54 supports it, towards the user location. With the first wheel support 56 now repositioned towards the user location, the user loads a first spare wheel 14 to the first wheel support 56.

With a second wheel support 56, unlike the first wheel support 56 and now onboard first spare wheel 14, not facing towards the user location, the user uses a handle 66 to manually face the second wheel support 56, under the axial rotation for which the undercarriage 54 supports the wheel frame 52, towards the user location. With the second wheel support 56 facing towards the user location, the user loads a second spare wheel 14 to the second wheel support 56. With the wheel frame 52, by each wheel support 56, securely carrying a spare wheel 14, the user concludes the loading cycle by using a handle 66 to manually reposition the wheel frame 52, under the radial movement for which the undercarriage 54 supports it, back to its home position H.

Figure 2:
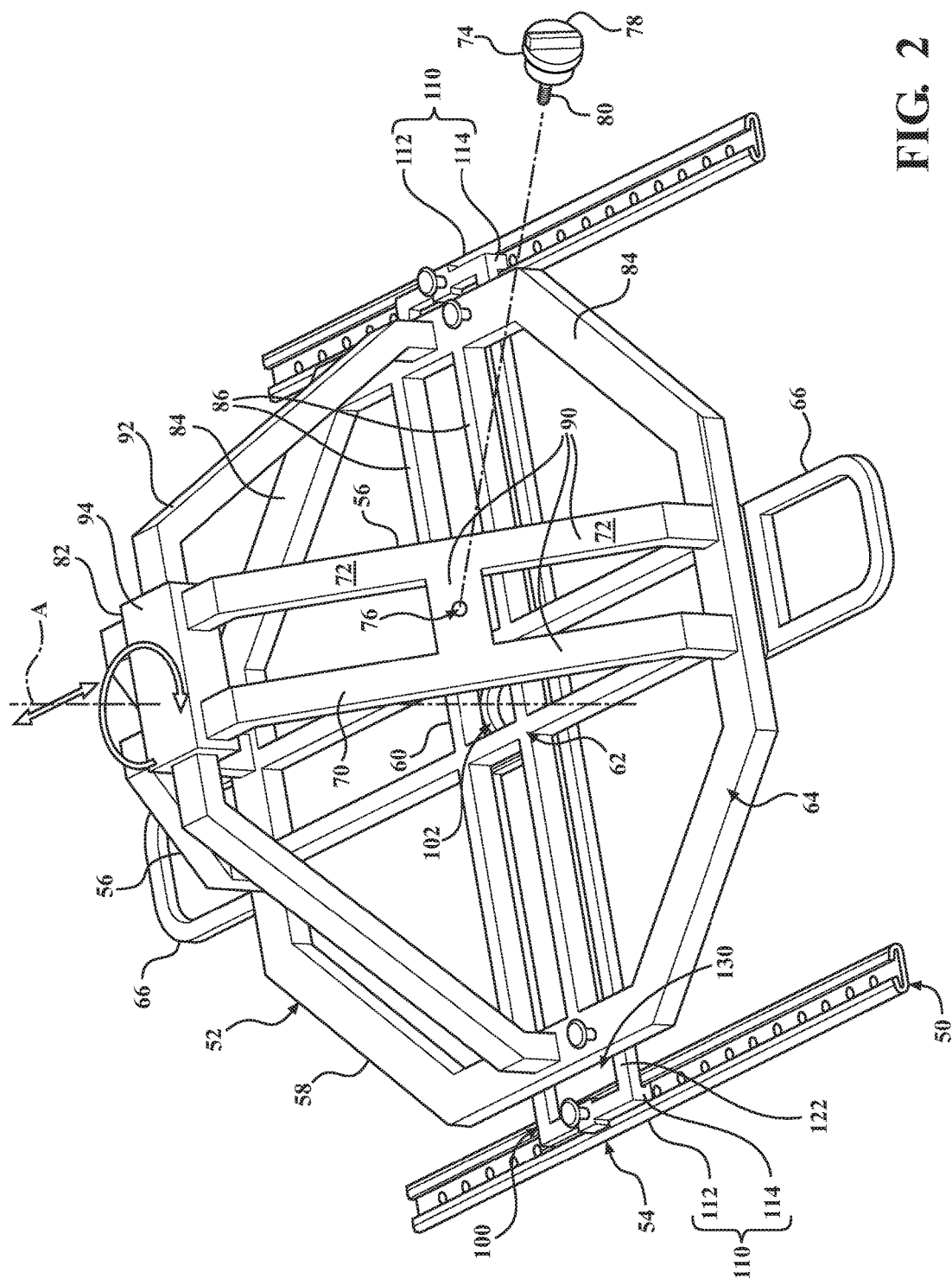
FIG. 2 is an enlarged perspective view of the spare wheel carrier, better showing a translational support system of the spare wheel carrier's undercarriage that serves to support its wheel frame for radial movement, and a rotational support system of the spare wheel carrier's undercarriage that serves to support its wheel frame for axial rotation.

With reference primarily to FIGS. 1 and 2, the spare wheel carrier 50 includes, as part of its undercarriage 54, a translational support system 100 and a rotational support system 102. The translational support system 100 serves to support the wheel frame 52 for the radial movement, while the rotational support system 102 serves to support the wheel frame 52 for the axial rotation.

In the spare wheel carrier 50, the undercarriage 54 is mounted to the bed 12, between it and the wheel frame 52. In a successive mounting configuration, the translational support system 100 and the rotational support system 102 are successively mounted between the bed 12 and the wheel frame 52. The translational support system 100 supports the wheel frame 52 for the radial movement independently from the rotational support system 102 supporting the wheel frame 52 for the axial rotation. Likewise, the rotational support system 102 supports the wheel frame 52 for the axial rotation independently from the translational support system 100 supporting the wheel frame 52 for the radial movement. It will be understood that the successive and other mounting configurations are not exclusive to additional movement enabling support systems being mounted between the bed 12 and the wheel frame 52.

In an example implementation of the successive mounting configuration, the translational support system 100 is mounted to the bed 12, the rotational support system 102 is mounted to the translational support system 100, and the wheel frame 52 is mounted to the rotational support system 102. The translational support system 100 is, accordingly, mounted between the bed 12 and the rotational support system 102, while the rotational support system 102 is mounted between the translational support system 100 and the wheel frame 52. The translational support system 100 supports the remainder of the spare wheel carrier 50, including the rotational support system 102 and the wheel frame 52, for translational movement with respect to the bed 12, a product of which is the radial movement of the wheel frame 52. Independently from this, the rotational support system 102 supports the wheel frame 52, with respect to the translational support system 100 and, by extension, with respect to the bed 12, for the axial rotation. In an analogous implementation of the successive mounting configuration, the rotational support system 102 could be mounted to the bed 12, with the translational support system 100 mounted to the rotational support system 102, and the wheel frame 52 mounted to the translational support system 100.

The undercarriage 54 includes, as part of its translational support system 100, one or more linear slides 110. Each linear slide 110 is, like the translational support system 100 to which it belongs, mounted between the bed 12 and the rotational support system 102. Each linear slide 110 underlies the wheel frame 52, and is oriented in the direction of the radial movement. With the wheel frame 52, under the radial movement, being rearwardly and forwardly radially moved between its home position H and its unload/load position U/L, each linear slide 110 is oriented in the longitudinal direction of the vehicle 10. Each linear slide 110 has a guide rail 112 and a carriage 114 riding on the guide rail 112. The carriage 114 may be or include a sleeve bearing carriage, a ball bearing carriage or a track roller carriage, for example, or any combination of these.

In a multiple linear slide 110 configuration, the undercarriage 54 includes two spaced apart linear slides 110 as part of its translational support system 100. In their spaced apart relationship, the two linear slides 110 underlie the wheel frame 52 at opposed respective portions of the peripheral area 64 of its base 58, and are commonly oriented in the longitudinal direction of the vehicle 10 or otherwise in the direction of the radial movement of the wheel frame 52.

Figure 4:
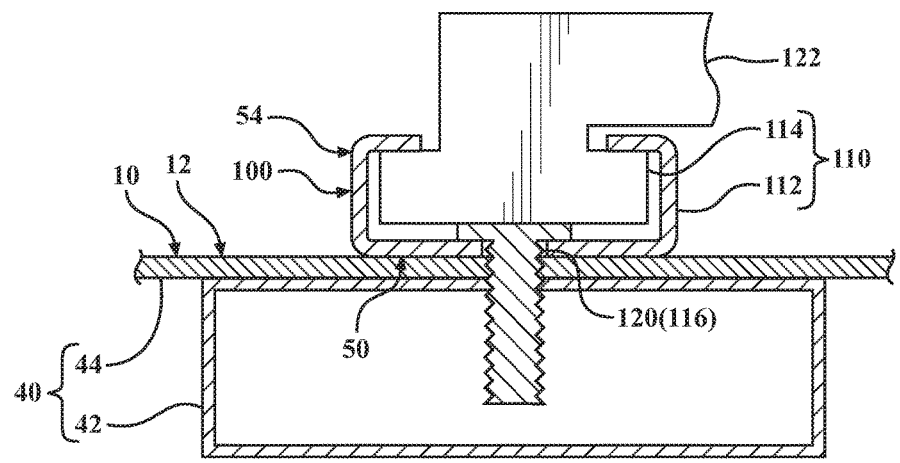
FIG. 4 is a cross section of the of the vehicle taken across the line 4-4 in FIG. 1, showing aspects of a mounting interface by which the spare wheel carrier is mounted to the vehicle's bed via the translational support system of the spare wheel carrier's undercarriage.

As part of its translational support system 100, the undercarriage 54 includes a mounting interface by which the translational support system 100 is mounted to the bed 12. As shown with additional reference to FIG. 4, this mounting interface is represented, at each linear slide 110, by its guide rail 112. Each guide rail 112 may include any number of bolt receiving holes 116 by which the linear slide 110 as a whole is mountable to the bed 12. In a mounting configuration exploiting existing features of the body structure 40, one, some or all of the bolt receiving holes 116 of each guide rail 112 are located and sized to receive an existing bolt 120 extending through the floor panel 44 and retentively received by a side rail 42. With the translational support system 100, via the guide rail 112 of each of each of its linear slides 110, supporting the remainder of the spare wheel carrier 50, this mounting configuration realizes the bed-mounted configuration of the spare wheel carrier 50, while reducing or eliminating the need to modify the vehicle 10 or its body structure 40.

Thus mounted to the bed 12, with the carriage 114 of each of its linear slides 110 free to ride on the guide rail 112 thereof, the translational support system 100 is equipped to support the remainder of the spare wheel carrier 50, including the rotational support system 102 and the wheel frame 52, for translational movement with respect to the bed 12. A product of this is the radial movement of the wheel frame 52.

As part of its translational support system 100, the undercarriage 54 includes an additional mounting interface by which the rotational support system 102 is mounted to the translational support system 100. With the undercarriage 54 including two linear slides 110, and in other multiple linear slide configurations, this mounting interface is represented by a bridge 122. The bridge 122 spans the linear slides 110, and is carried by the linear slides 110 for movement in the direction of the radial movement of the wheel frame 52. More specifically, the bridge 122 is mounted on the carriages 114 riding on the respective guide rails 112 of the linear slides 110. In a single linear slide configuration, in which the undercarriage 54 includes one linear slide 110, this mounting interface could be represented by the carriage 114 riding on the guide rail 112 of the linear slide 110.

Figure 5:
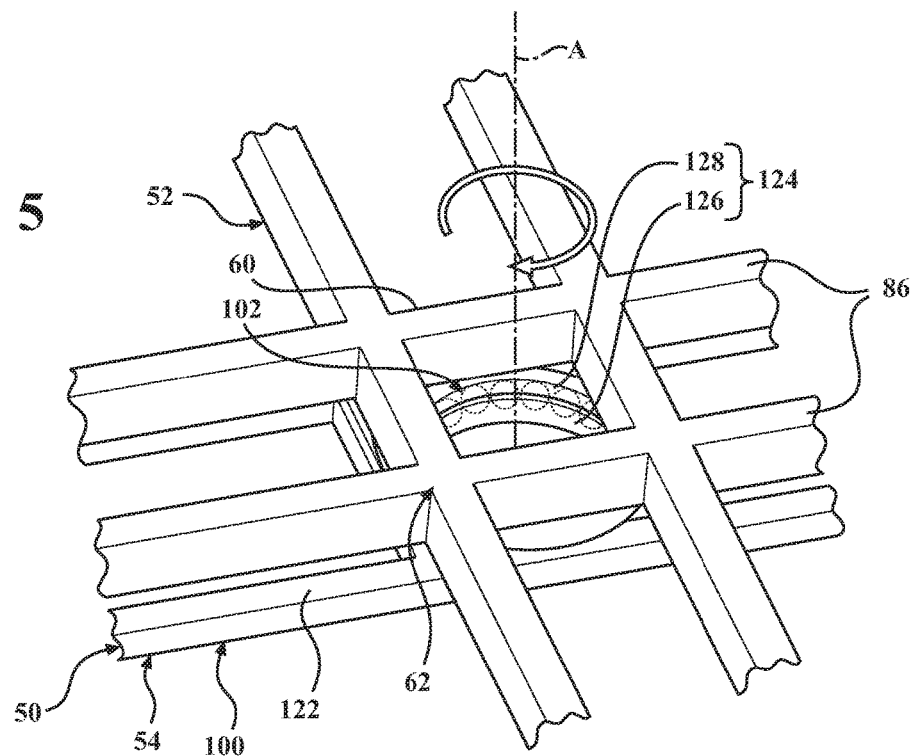
FIG. 5 is an enlarged perspective view of the spare wheel carrier, better showing aspects of the rotational support system of the spare wheel carrier's undercarriage.

As shown with additional reference to FIG. 5, the undercarriage 54 includes, as part of its rotational support system 102, a centrally located rotary bearing 124 at the central axis A of the wheel frame 52. The rotary bearing 124 is, like the rotational support system 102 to which it belongs, mounted between the translational support system 100 and the wheel frame 52. The rotary bearing 124 underlies the wheel frame 52, and is axially oriented with the axis A of the wheel frame 52 for rotation common with the axial rotation. The rotary bearing 124 has a first rotation element 126 and a second rotation element 128 that rotate with respect to one another. The rotary bearing 124 may house ball bearings between its first rotation element 126 and its second rotation element 128, for example.

As part of its rotational support system 102, the undercarriage 54 includes a mounting interface by which the rotational support system 102 is mounted to the translational support system 100. This mounting interface is represented, in the rotary bearing 124, by the first rotation element 126. The first rotation element 126 is mounted to the bridge 122 or otherwise to the translational support system 100, which immobilizes it with respect to the remainder of the undercarriage 54.

Thus mounted to the translational support system 100, with the second rotation element 128 of its rotary bearing 124 free to rotate, the rotational support system 102 is equipped to support the wheel frame 52, with respect to the translational support system 100 and, by extension, with respect to the bed 12, for the axial rotation.

As part of its rotational support system 102, the undercarriage 54 includes an additional mounting interface by which the wheel frame 52 is mounted to the rotational support system 102. This mounting interface is represented, in the rotary bearing 124, by the second rotation element 128. With the hub 60 of the wheel frame 52 representing the mounting interface by which the wheel frame 52 is mounted to the undercarriage 54, the wheel frame 52 is mounted, by its hub 60, to the second rotation element 128.

As shown with additional reference to FIG. 6, the spare wheel carrier 50 includes a lock system 130 by which the wheel frame 52 is selectively locked, with respect to the bed 12, from any combination of the radial movement and the axial rotation for which the undercarriage 54 supports it. The spare wheel carrier 50 includes, as part of its lock system 130, one or more locking members 132. Each locking member 132 directly or indirectly lodges between any combination of the mounting interfaces of the undercarriage 54 represented in its translational support system 100 and its rotational support system 102.

As shown with additional reference to FIG. 7A, the spare wheel carrier 50 includes, as part of its lock system 130, a first locking member 132 by which the wheel frame 52 is selectively locked from the radial movement for which the translational support system 100 supports it.

The first locking member 132 is a lock pin. In the translational support system 100, in a directly lodging configuration, the first locking member 132 lodges in a recess 134 aligned across a guide rail 112 of given linear slide 110 and the bridge 122 that spans the linear slides 110. The guide rail 112 of the linear slide 110 represents the mounting interface by which the translational support system 100 is mounted to the bed 12. The bridge 122, on the other hand, represents the mounting interface by which the remainder of the spare wheel carrier 50, including the rotational support system 102 and the wheel frame 52, is mounted to the translational support system 100. Accordingly, the first locking member 132, by lodging between these mounting interfaces, selectively locks the wheel frame 52 from the radial movement for which the translational support system 100 supports it.

As shown with additional reference to FIG. 7B, the spare wheel carrier 50 includes, as part of its lock system 130, a second locking member 132 by which the wheel frame 52 is selectively locked from the axial rotation for which the rotational support system 102 supports it.

The second locking member 132 is, like the first locking member 132, a lock pin. In relation to the rotational support system 102, in an indirectly lodging configuration, the second locking member 132 lodges in a recess 136 aligned across the bridge 122 that spans the linear slides 110 of the translational support system 100, and a peripheral frame rail 84 forming the base 58 of the wheel frame 52. The bridge 122 is that which the first rotation element 126 of the rotary bearing 124, as part of the rotational support system 102, is mounted to. In the rotary bearing 124, the first rotation element 126 represents the mounting interface by which the rotational support system 102 is mounted to the translational support system 100. The peripheral frame rail 84, on the other hand, is part of the rigidly interconnected frame rails forming the base 58 of the wheel frame 52, including its hub 60, which is mounted to the second rotation element 128 of the rotary bearing 124. In the rotary bearing 124, the second rotation element 128 represents the mounting interface by which the wheel frame 52 is mounted to the rotational support system 102. Accordingly, the second locking member 132, by lodging between these mounting interfaces, selectively locks the wheel frame 52 from the axial rotation for which the rotational support system 102 supports it.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A spare wheel carrier, comprising:
   a wheel frame having an upright axis, the wheel frame including multiple differently arranged wheel supports each configured to securely carry a spare wheel; and
   a surface-mountable undercarriage configured, when mounted to a surface, to support the wheel frame for radial movement and axial rotation with respect to the surface under which each wheel support is subject to arrangement towards a defined user location.

2. The spare wheel carrier of claim 1, wherein each wheel support has an upstanding orientation, and is configured to securely carry a spare wheel in its upstanding orientation.

3. The spare wheel carrier of claim 1, wherein the wheel supports have circumferentially-spaced respective upright orientations, and each wheel support is configured to securely carry a spare wheel in its upright orientation.

4. The spare wheel carrier of claim 1, wherein each wheel support includes a wheel-bearing wheel face configured to support a spare wheel, and an associated wheel fastener configured to selectively secure a spare wheel supported by the wheel face to the wheel frame against the wheel face.

5. The spare wheel carrier of claim 4, wherein the wheel face of each wheel support is configured to support a spare wheel on its side.

6. The spare wheel carrier of claim 1, wherein the undercarriage includes a rotational support system configured to support the wheel frame for the axial rotation, and a translational support system configured to support the wheel frame for the radial movement.

7. The spare wheel carrier of claim 1, wherein the undercarriage includes a rotational support system configured to support the wheel frame for the axial rotation, and a surface-mountable translational support system configured, when mounted to the surface, to support the rotational support system, and the wheel frame, via the rotational support system, for the radial movement.

8. A vehicle, comprising:
   a bed;
   a wheel frame having an upright axis located above the bed, the wheel frame including multiple differently arranged wheel supports each configured to securely carry a spare wheel; and
   an undercarriage mounted to the bed between the bed and the wheel frame, the undercarriage configured to support the wheel frame for radial movement and axial rotation with respect to the bed under which each wheel support is subject to arrangement towards a defined user location at the rear of the vehicle.

9. The vehicle of claim 8, wherein each wheel support has an upstanding orientation, and is configured to securely carry a spare wheel in its upstanding orientation.

10. The vehicle of claim 8, wherein the wheel supports have circumferentially-spaced respective upright orientations, and each wheel support is configured to securely carry a spare wheel in its upright orientation.

11. The vehicle of claim 8, wherein each wheel support includes a wheel-bearing wheel face configured to support a spare wheel, and an associated wheel fastener configured to selectively secure a spare wheel supported by the wheel face to the wheel frame against the wheel face.

12. The vehicle of claim 11, wherein the wheel face of each wheel support is configured to support a spare wheel on its side.

13. The vehicle of claim 8, wherein the undercarriage includes a rotational support system configured to support the wheel frame for the axial rotation, and a translational support system configured to support the wheel frame for the radial movement.

14. The vehicle of claim 8, wherein the undercarriage includes a rotational support system configured to support the wheel frame for the axial rotation, and a translational support system mounted to the bed, the translational support system configured to support the rotational support system, and the wheel frame, via the rotational support system, for the radial movement.

15. A spare wheel carrier, comprising:
   a wheel frame having an upright axis, the wheel frame including a hub and multiple outboard generally planar wheel-bearing wheel faces, the wheel faces having circumferentially-spaced respective inclined orientations whereby the wheel faces are inclined towards one another in a converging relationship, and each configured to support a spare wheel on its side in its inclined orientation;
   a rotary bearing configured to support the wheel frame, by its hub, for axial rotation; and
   multiple surface-mountable linear slides, the linear slides configured, when mounted to a surface, to carry a bridge between them, and support the rotary bearing, and the wheel frame, via the rotary bearing, on the bridge for radial movement with respect to the surface.

16. The spare wheel carrier of claim 15, wherein the wheel frame includes two wheel faces having opposing respective inclined orientations.

17. The spare wheel carrier of claim 15, wherein the wheel frame includes a generally planar base oriented normally to the axis, the base having a central area and a peripheral area, and including the hub at its central area, and wherein each of the wheel faces extends from the base at circumferentially-spaced respective portions of its peripheral area.

18. The spare wheel carrier of claim 15, wherein the wheel frame includes, for each of the wheel faces, an associated wheel fastener configured to selectively secure a spare wheel supported by the wheel face to the wheel frame against the wheel face.

19. The spare wheel carrier of claim 15, wherein each of the wheel faces has a threaded hole, and the wheel frame includes, for each of the wheel faces, an associated wheel fastener, the wheel fastener including a head configured to engage a rim of a spare wheel supported by the wheel face, and a threaded shank configured to extend through the spare wheel's rim for selective threaded engagement with the wheel face's threaded hole to secure the spare wheel to the wheel frame against the wheel face.

* * * * *